United States Patent [19]
Allensworth

[11] Patent Number: 6,044,038
[45] Date of Patent: Mar. 28, 2000

[54] MARINE SEISMIC CABLE SYSTEM

[75] Inventor: David Carter Allensworth, Pearland, Tex.

[73] Assignee: Western Atlas International, Inc., Houston, Tex.

[21] Appl. No.: 09/093,126

[22] Filed: Jun. 8, 1998

[51] Int. Cl.[7] ...................................................... G01V 1/38
[52] U.S. Cl. .............................. 367/16; 367/144; 367/20; 181/120
[58] Field of Search ................................ 367/16, 144, 20; 181/118, 120

[56] References Cited

U.S. PATENT DOCUMENTS

| | | |
|---|---|---|
| 3,275,097 | 9/1966 | Pavey, Jr. . |
| 4,597,065 | 6/1986 | Lien et al. ................................. 367/20 |
| 5,615,170 | 3/1997 | Chelminski ................................. 367/15 |

*Primary Examiner*—Christine K. Oda
*Assistant Examiner*—Anthony Jolly
*Attorney, Agent, or Firm*—Alan J. Atkinson

[57] ABSTRACT

A marine seismic cable system for marine surveying comprises an electrical conductor within a tubing for conveying compressed air and electricity between a seismic vessel and equipment such as air guns. The tubing resists elongation caused by water drag forces acting against the tubing exterior surface and provides a protective shield to the enclosed electrical conductor or conductor bundle. This combination uniquely conveys compressed air and electricity while significantly reducing the outside cable diameter to reduce the weight and drag forces acting on the cable system. The combination also permits repair and replacement of the tubing or electrical conductor independent of the other component.

18 Claims, 3 Drawing Sheets

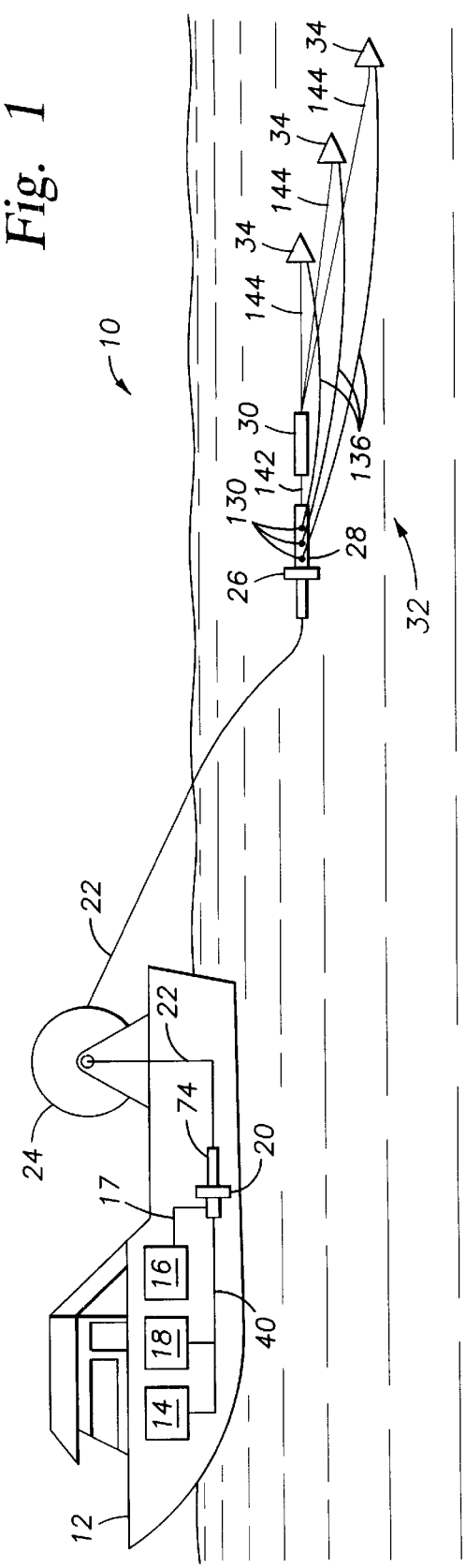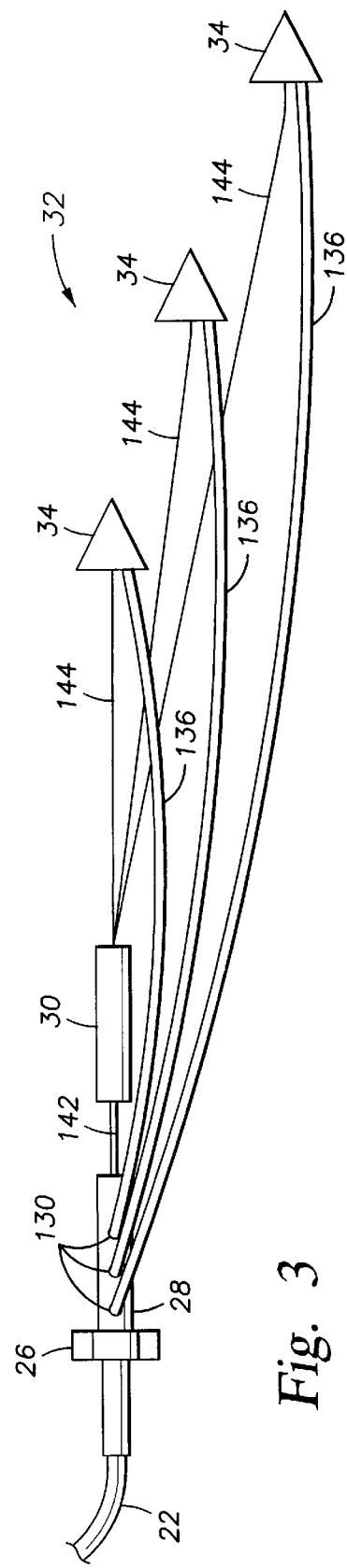

MARINE SEISMIC CABLE SYSTEM

BACKGROUND OF THE INVENTION

The present invention relates to the field of marine seismic exploration. More particularly, the invention relates to an integrated marine seismic cable system having a flexible cable housing and internal electrical conductor.

In the field of marine seismic exploration, an acoustic signal is generated in a body of water by air guns and other seismic sources. Typically, several air guns are arranged in a selected pattern or arrangement known as a subarray. One or more air gun subarrays are towed behind a vessel to generate an acoustic signal for transmitting energy into subterranean geologic formations.

In a typical marine seismic survey operation, one end of an umbilical seismic cable is connected to an air gun subarray and the other end of the umbilical cable is connected to equipment carried by the seismic vessel. The umbilical cable supplies pressurized air and electrical power to the air guns and also provides contains an electrical conductor for transmitting electricity between the air guns and other equipment. U.S. Pat. No. 5,615,170 to Chelminski (1997) disclosed a representative air gun distribution system having a common high pressure hoseline for distributing compressed air to multiple air guns.

Conventional umbilical cables contain an air hose attached to umbilical cables for transporting pressurized air to the air guns. Multiple insulated electrical conductors are placed around the air hose for carrying electrical power to the air guns and for providing communication between the air guns and the vessel based equipment. An outer shell having armor components and an outer protective jacket is located around the electrical conductors. Each umbilical cable is hundreds of feet long and is normally stored with a rotatable storage reel. The storage reel imparts bending stress on the electrical conductors as the cable is deployed and retrieved from the storage reel.

Conventional umbilical cables combine the electrical conductors as an integral, non-removable part of the umbilical cable during cable fabrication. If one of the electrical conductors is damaged, the damaged electrical conductor cannot be removed from the cable. Efforts to locate and repair the damaged electrical conductor portion are expensive and difficult to perform in the field, and conventional repair requires replacement of the entire cable section with a spare cable section.

Another limitation of conventional umbilical cables is the outside cable diameter. Large cable profiles affect the overall weight and manufacturing cost of the umbilical and the operational costs of storing and towing the umbilical during seismic surveying operations. In a long umbilical cable, a small increase in the cable diameter results in a large increase in the overall weight of the umbilical cable. A larger umbilical cable also results in more drag as the cable is towed behind a marine seismic vessel. This drag increases vessel fuel consumption which increases operational expenses and also causes additional drag forces and the resulting umbilical cable stresses which shorten the usable cable life.

U.S. Pat. No. 5,506,818 to Johnston (1996) disclosed a hose bundle containing an electrical cable disposed within an air hose. The cable was reinforced with multiple, torque balanced armor layers formed with relatively lightweight Kevlar manufactured by the DuPont company. One difficulty of this construction is that Kevlar stretches under strain. This lengthening of the outer covering will transfer stress to the electrical conductor inside the hose bundle, thereby causing parting and other failures of the electrical conductor. To reduce the stretching problems associated with Kevlar, Johnston utilized multiple wrapped layers to spread the total load over multiple Kevlar strands. This created new problems however by increasing the outside dimension of the cable assembly, which increased the weight and drag forces acting on the cable.

The braided Kevlar strands taught by Johnston introduced other problems because the outer surface of the hose bundle is by tag lines in the seismic system. Tag lines comprise secondary lines connecting the hose bundle to offsets or deflectors such as paravanes which pull the hose bundle to a desired offset from the vessel. If the Kevlar strength members are damaged by such contact, parting or other permanent damage to the unbilical and electrical conductor can occur.

As marine seismic exploration evolves, longer marine seismic cables are required and are offset further and further from the vessel centerline. There is a need, therefore, for an improved cable system which reduces drag, which permits maintenance and repair on the vessel, and which increases the useful life of the seismic cables.

SUMMARY OF THE INVENTION

The invention provides a unique system for connecting a towed marine seismic source to equipment on a seismic vessel. The invention comprises a hollow tubing resistant to elongation for connecting the marine seismic source to the seismic vessel. The tubing is sufficiently flexible to permit coiled storage of said tubing on the vessel and to permit deployment of said tubing into an elongated orientation behind the vessel. An electrical conductor detachable from the tubing is positioned within said tubing for transmitting electricity between the equipment and the marine seismic source.

In another embodiment of the invention, a pressurized air source provides pressurized air to a seismic source apparatus, and a cable assembly is connected between the electrical power source, the pressurized air source and the seismic source apparatus. The cable assembly comprises a metallic, hollow tubing resistant to elongation for conveying pressurized air from said pressurized air source to the seismic source apparatus, and further comprises an electrical conductor within the hollow tubing for communicating electrical power from the electrical power source to the seismic source apparatus.

BRIEF DESCRIPTION OF THE DRAWINGS

FIG. 1 illustrates a schematic view of a seismic vessel towing a cable and air gun array.

FIG. 3 illustrates a detailed view of an air gun array.

DESCRIPTION OF THE PREFERRED EMBODIMENTS

Figure 4:
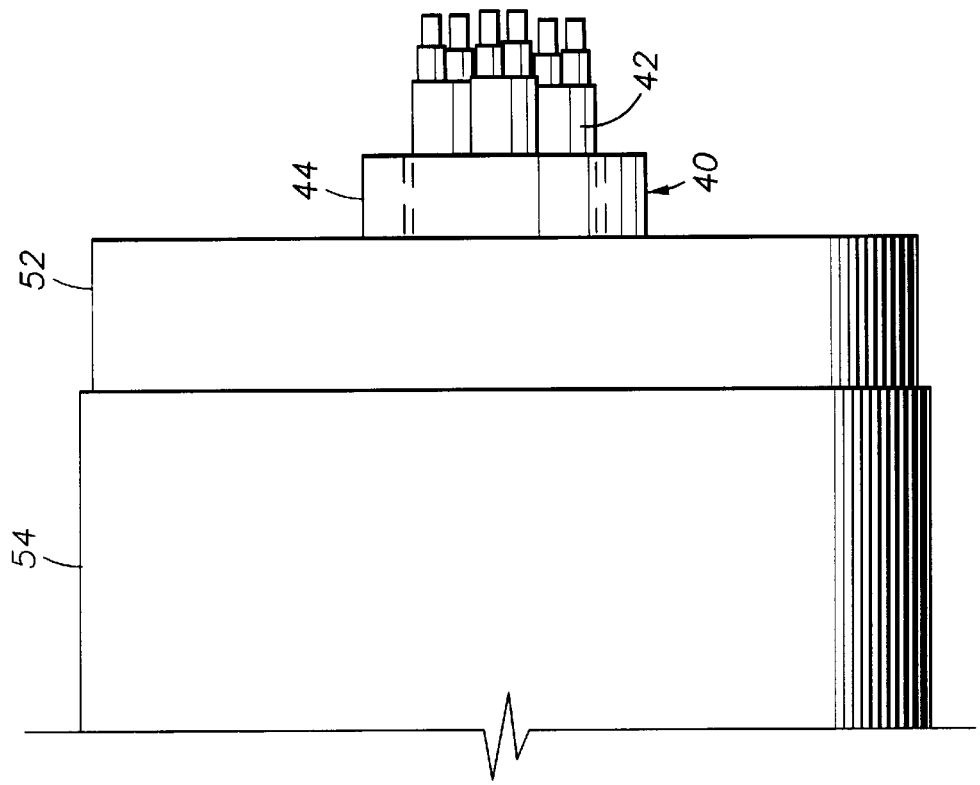
FIG. 4 illustrates a cutaway view of an electrical conductor bundle with a tubing member.

The present invention provides an improved cable system for supplying compressed air and electricity between a seismic vessel and towed equipment. FIG. 1 illustrates a preferred embodiment of a marine seismic cable system 10 in operation with a vessel 12 which generally contains control system 14, a pressurized air supply or compressor 16 and an electrical power supply 18. Marine seismic source system 10 contains a supply fitting 20, a cable assembly 22, a storage reel 24, a distribution fitting 26 with a manifold 28, a source synchronizer 30 and an air gun subarray 32 made up of a plurality of air gun stations or air guns 34. Control system 14 preferably comprises a computer based system located on vessel 12. However alternative configurations such as remote systems may be used where control system 14 is partially or wholly located in the water behind vessel 12. Compressor 16 normally provides a source of compressed air for firing air guns 34.

Figure 2:
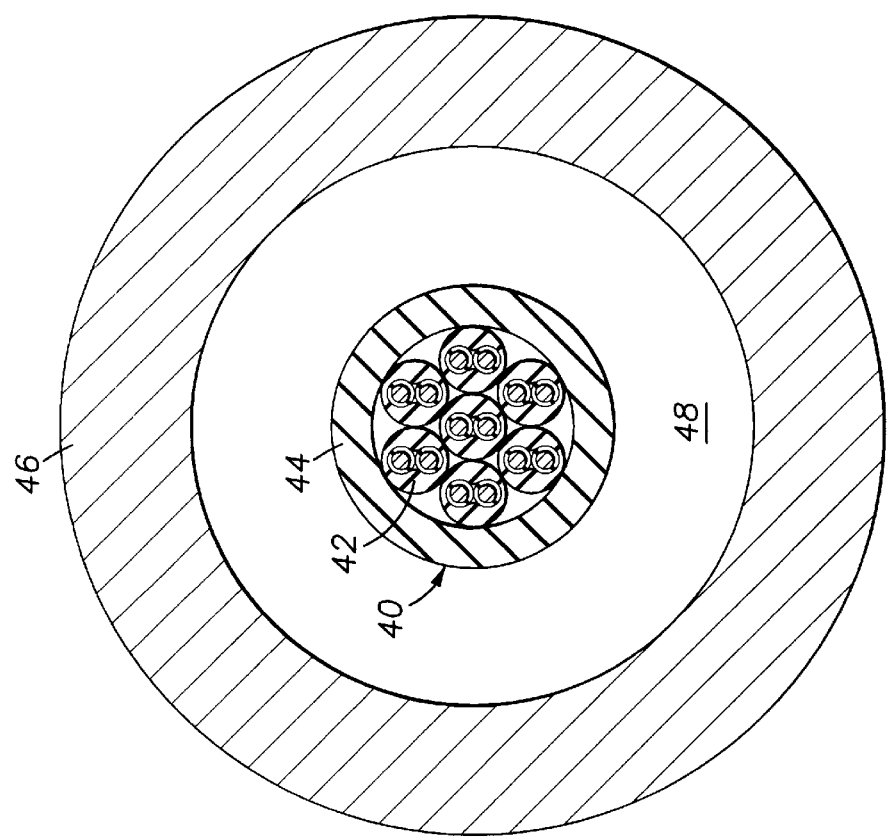
FIG. 2 illustrates a sectional view of an electrical conductor bundle positioned with a tubing member.

FIG. 2 illustrates a cross-sectional view of cable assembly 22. Electrical cable 40 can contains an electrical conductor 42 and insulation layer 44. In different embodiments of the invention, electrical conductor 42 can comprise a single wire, a pair of wires, or multiple wires or wire pairs helically wound or otherwise bound together into a single cable. Electrical cable 40 is positioned within the hollow interior of tubing 46. The annular hollow space between tubing 46 and electrical cable 40 is identified as flowpath 48, and provides a conduit for transmitting compressed air from compressor 16 to distributing fitting and to air guns 34.

Insulated electrical conductor 42 transmits electrical power from electrical power supply 18 located on vessel 12 to manifold 28, to source synchronizer 30 and air gun stations 34, and transmits data signals to and from the control system 14. Electrical conductor 42 is enclosed within insulation layer 44 which is made of a material such as high density polyurethane or other suitable material for stabilizing electrical characteristics such as capacitance and impedance of the electrical system. Insulation layer 44 is designed to withstand high pressure and to provide stable electrical characteristics. The insulation material for insulation layer 44 is also selected to withstand high pressure fluctuations and to resist erosion forces from the velocity of fast flowing compressed air moving over electrical cable 40 within flowpath 48. Flowpath 48 between the outside of the electrical cable 40 and the inside of the tubing 46 is large enough for the volume of pressurized air needed to operate air guns 34.

In a preferred embodiment, tubing 46 is formed with a flexible metallic material such as stainless steel, titanium, alloy materials or carbon steel. One of the principle desirable characteristics of tubing 46 is the fatigue or cycle life. Cost and ease of manufacturing are also factors used to determine the type of material used for tubing 46. These materials are meant by way of example and are not meant to limit the scope of the invention.

The cost of manufacturing tubing 46 is approximately one fourth the cost of conventional armored wire hose bundles. This cost saving offers significant economies and superior performance over conventional cable systems. By using tubing 46 instead of an armored wire hose bundle, the outside diameter of the cable assembly 22 can be reduced in size from about two inches to approximately one and a quarter inches, resulting in a reduction exceeding thirty-five percent. By installing the electrical cable 40 inside cable assembly 22, the electrical cable 40 can be reused when the outer part of tubing 46 is damaged and is replaced. This feature permits maintenance and repair operations to be conducted on board vessel 12 by replacing either tubing 46 or electrical cable 40 as required.

FIG. 4 illustrates a cut away view of cable assembly 22 which is encased in a covering 54 made of fibers or strands such as Kevlar. A high strength, low density synthetic fiber such as Kevlar or another material with similar characteristics may be used to form covering 54. Cable assembly 22 is sufficiently flexible and is not internally stressed when cable assembly 22 is wound onto storage reel 24. By using tubing 46 for the multiple purposes as a strength member and as a protective housing for electrical conductor 42, significant weight reductions and size reductions can be achieved over prior art cable systems without comprising the tensile strength cable, and without exposing electrical conductor 42 to parting damage.

By loosely disposing electrical cable 40 with in tubing 46 with connections located at fittings 20 and 26, minimal stress is placed on the electrical conductors 42 during storage on storage reel 24 and during towing operations. This feature of the invention provides for relative axial movement of electrical conductor 42 within tubing 46 as cable assembly is deployed in the water, moves within the water, and is retrieved from the water. If either electrical cable 40 or tubing 46 is damaged, either can be replaced in the water or on board vessel 12 without replacing an entire cable section.

As shown in FIG. 1, supply fitting 20 connects one end of the cable assembly 22 to control system 14, compressors 16 and electrical power supply 18. The distribution fitting 26 in FIG. 3 connects the other end of cable assembly 22 to manifold 28. The components of the supply and distribution fittings 20 and 26 respectfully are preferably made of a non-corrosive material such as stainless steel.

Figure 5:
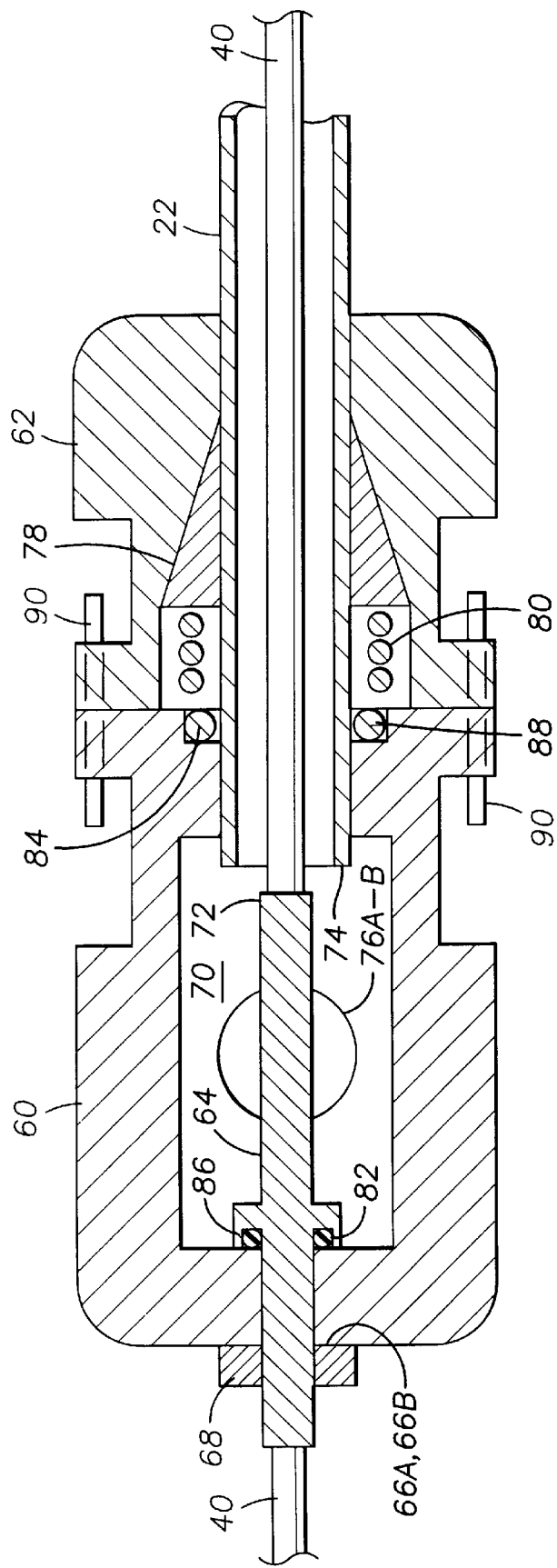
FIG. 5 illustrates the engagement of the tubing and electrical conductor with an air gun.

FIG. 5 illustrates a partial cross-sectional view of a preferred embodiment of fittings 20 and 26 for terminating the ends of cable assembly 22. Although the description of the elements in FIG. 5 will be described for supply fitting 20, fittings 20 and 26 are designed for interchangeable use and distribution fitting 26 can comprise a mirror image of supply fitting 20.

The purpose of fittings 20 and 26 is to integrate and separate electrical cable 40 from tubing 46 while maintaining pressurized seal integrity for marine seismic source system 10. Supply fitting 20 contains a component block 60 and an integrated block 62. Electrical cable 40 is fitted into an electrical cable ferrule 64 which extends through an electrical input port 66a in component block 60. Retaining clamp 68 provides the pressure necessary to seal electrical ferrule 64 around electrical cable 40. Ferrule 64 extends into air chamber 70 inside component block 60. Electrical cable 40 continues beyond termination end 72 of electrical cable ferrule 64 and into first end 74 of tubing 46 where it becomes part of cable assembly 22.

Pressurized air is input to air chamber 70 through a pressurized air input port 76a where it flows into the open passageway of tubing 46 for transmission to the air gun stations 34 as shown in FIGS. 1 and 3. To provide necessary pressure seals, a split collet 78 and a collet-preload spring 80 are located in the integrated block 62 and seals, such as O-ring 82 and tube seal 84, and in apertures 86 and 88 in the component block 60. Component and integrated blocks 60 and 62 are connected with industry standard connectors such as connector pins 90 shown in FIG. 5.

Electrical conductors 42 in electrical cable 40 are connected at the supply end to electrical power supply 18 and control system 14. Compressors 16 are connected to cable assembly 22 through air compressor hose 17 and into pressurized air input port 76a of supply fitting 20 of cable assembly 22.

As shown in FIG. 3, distribution fitting 26 is connected on the other end of cable assembly 22 in a manner similar to that used for supply fitting 20. Electrical cable 40 exits distribution fitting 26 through an electrical outlet port 66b and extends through manifold 28 where it connects to source synchronizer 30. Pressurized air exits cable assembly 22 through pressurized air outlet 78b into manifold 30.

FIG. 3 illustrates a submerged portion for one embodiment of marine seismic cable system 10. Manifold 28 has one outlet port 130 for each air gun or air gun station 34 in air gun subarray 32. Each air gun station 34 can contain a single air gun or multiple air guns depending on the configuration of the system used. Pressurized air is distributed through air outlet ports 130 into air outlet hoses 136 which are connected to individual air guns. The combination of the components of distribution fitting 25 provide a means within distribution fitting 26 for transferring pressurized air from tubing 46 to outlet ports 130.

Electrical cable 40 extends through manifold 28 to supply electrical power to source synchronizer 30 through a source synchronizer electrical cable 142 and to the air gun stations 34 through air gun station electrical cables 144. Electrical signals also are transmitted between the air gun stations 34 and source synchronizer 30 through air gun station electrical cables 144. Source synchronizer 30 activates all air guns in air gun subarray 34 at the same time by transmitting electrical signals through air gun station electrical cables 144. By distributing pressurized air and electrical power and signals from manifold 28 and the source synchronizer 30, which are located underwater in close proximity to air gun stations 34, fewer pairs of electrical conductors 42 are required in cable assembly 22.

Different combinations of the various inventive embodiments are possible without departing from the scope of the invention. For example, excess length of the electrical conductor can be stored within the hollow tubing so that elongation of the tubing does not impart axial stress or loads on the electrical conductor. The unique combination of an electrical conductor within a compressed air carrying tubing provides significant weight reduction, less drag because of the reduced cross-sectional area, less manufacturing cost, significantly higher resistance to damage during deployment and use and retrieval of the cable system, and enhanced maintenance capabilities. Although the electrical conductor is loosely placed within the tubing, spiders or other forms of spacers could position the conductor within the center of the tubing flowpath. The cable system can transport compressed air and other pressurized gases or fluids, and can conduct electrical power or signals or both in different directions between a vessel and remotely deployed equipment. As described above, the cable system can provide electrical communication and compressed air to multiple air guns and to other combinations of equipment on the vessel or in the water.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A cable assembly for connecting a towed marine seismic source to equipment on a seismic vessel, comprising:

a hollow tubing resistant to elongation for connecting the marine seismic source to the seismic vessel, wherein said tubing is sufficiently flexible to permit coiled storage of said tubing on the vessel and to permit deployment of said tubing into an elongated orientation behind the vessel; and an electrical conductor positioned within said hollow tubing for transmitting electricity between the equipment and the marine seismic source, wherein said conductor is selectively detachable from said tubing.

2. A cable assembly as recited in claim 1, wherein said equipment includes an air compressor and said tubing is capable of conveying compressed air from the air compressor to the seismic source.

3. A cable assembly as recited in claim 1, wherein said electrical conductor is capable of transmitting electric power from the equipment to the seismic source.

4. A cable assembly as recited in claim 1, wherein said electrical conductor is capable of transmitting electric signals between the seismic source and the vessel.

5. A cable assembly as recited in claim 1, wherein the seismic source comprises at least two air guns, and further comprising a manifold connected between said tubing and said air guns for distributing the compressed air from said tubing to each air gun.

6. A cable assembly as recited in claim 1, wherein said electrical conductor comprises at least two conductors, and wherein at least one separate conductor is connected to each air gun.

7. A cable assembly as recited in claim 1, wherein said tubing is constructed with a metal.

8. A cable assembly as recited in claim 1, further comprising at least two cable assemblies each connecting a different seismic source to the seismic vessel, wherein said tubing in each cable assembly provides sufficient strength to retain the respective seismic source in substantially the same position relative to the seismic vessel as the seismic sources are towed by the seismic vessel.

9. A marine seismic source system, comprising:

an electrical power source;

a pressurized air source;

a seismic source apparatus; and a cable assembly having a first end connected to said electrical power source and the pressurized air source and having a second end connected to the seismic source apparatus, wherein the cable assembly comprises a metallic, hollow tubing resistant to elongation for conveying pressurized air from said pressurized air source to the seismic source apparatus, and wherein said cable assembly further comprises an electrical conductor within the hollow tubing for communicating electrical power from the electrical power source to the seismic source apparatus.

10. A marine seismic source system as recited in claim 9, further comprising a fitting at each end of said cable assembly for receiving and for distributing air and electrical power into and out of said cable assembly.

11. A marine seismic source system as recited in claim 9, wherein said tubing is constructed from the group consisting of titanium, stainless steel and carbon steel.

12. A marine seismic source system as recited in claim 9, further comprising a synchronizer engaged with said electrical conductor and with said seismic source apparatus to coordinate the activation of said seismic source apparatus.

13. A marine seismic source system as recited in claim 9, further comprising a controller engaged with said electrical power source, pressurized air source, seismic source apparatus and said cable assembly for selectively activating such components.

14. A seismic source cable assembly for supplying pressurized air and electrical power to a seismic source towed in water behind a seismic vessel having a pressurized air supply and an electrical power supply and a control system, comprising:

a supply fitting having an inlet port for receiving pressurized air from the pressurized air supply;

a distribution fitting having an outlet port for discharging the pressurized air to the seismic source;

a hollow tubing for carrying the pressurized air between the supply fitting and said distribution fitting, wherein said tubing connects the seismic source to the seismic vessel and is sufficiently strong to resist elongation as the seismic source is towed through the water; and an electrical conductor disposed within said tubing and having a first end extending through the supply fitting and connecting to the electrical power supply and the control system and having a second end extending through the distribution fitting and connecting to the seismic source, wherein the electrical conductor is selectively detachable from the tubing.

15. A seismic source cable assembly as recited in claim 14, wherein said tubing is constructed with a metal.

16. A seismic source cable assembly as recited in claim 14, wherein said tubing and said electrical conductor are sufficiently flexible to be stored around a cylindrical reel.

17. A seismic source cable assembly as recited in claim 14, wherein said electrical conductor is longer than said tubing to permit elongation of said tubing in the water while isolating said conductor from axial stress.

18. A seismic source cable assembly as recited in claim 14, wherein said tubing comprises a seamless metal conduit.

* * * * *